(12) United States Patent
Alikhani (10) Patent No.: US 9,280,645 B1
(45) Date of Patent: Mar. 8, 2016

(54) LOCAL AND REMOTE VERIFICATION

(71) Applicant: EMC Corporation, Hopkinton, MA (US)

(72) Inventor: Kayvan Alikhani, Oakland, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 14/080,327

(22) Filed: Nov. 14, 2013

Related U.S. Application Data

(63) Continuation-in-part of application No. 14/025,333, filed on Sep. 12, 2013, and a continuation-in-part of application No. 14/025,377, filed on Sep. 12, 2013.

(60) Provisional application No. 61/726,778, filed on Nov. 15, 2012, provisional application No. 61/726,788, filed on Nov. 15, 2012, provisional application No. 61/726,908, filed on Nov. 15, 2012.

(51) Int. Cl.
*G06F 12/14* (2006.01)
*G06F 17/00* (2006.01)
*G06F 21/31* (2013.01)

(52) U.S. Cl.
CPC ..................... *G06F 21/31* (2013.01)

(58) Field of Classification Search
CPC ........................................................ G06F 21/32
USPC ..................... 726/16, 1, 22, 23, 24
See application file for complete search history.

(56) References Cited

U.S. PATENT DOCUMENTS

| 4,449,189 A | 5/1984 | Feix et al. |
| 4,975,969 A | 12/1990 | Tal |
| 4,993,068 A | 2/1991 | Piosenka et al. |

(Continued)

FOREIGN PATENT DOCUMENTS

| EP | 2385679 A1 | 11/2011 |
| WO | 2004075097 A1 | 9/2004 |

(Continued)

OTHER PUBLICATIONS

Google Play, "Battlenet Mobile Authenticator," https://play.google.com/store/apps/details?id=com.blizzard.bma&hl=en, Mar. 2012, 2 pages.

(Continued)

*Primary Examiner* — Abu Sholeman
(74) *Attorney, Agent, or Firm* — Ryan, Mason & Lewis, LLP (57) ABSTRACT

A method includes receiving a verification request in a verification agent running on a given device and determining whether the verification agent is able to invoke a verification platform application programming interface (API). The method also includes, in the event that the verification agent is able to invoke the verification platform API, performing remote verification of the verification request via the verification platform. The method further includes, in the event that the verification agent is unable to invoke the verification platform API, starting an internal timer and performing local verification of the verification request at the given device. The method further includes granting the verification request responsive to one of a successful remote verification and a successful local verification within a given time period specified by the internal timer, otherwise denying the verification request.

20 Claims, 8 Drawing Sheets

(56) References Cited

U.S. PATENT DOCUMENTS

| | | | |
|---|---|---|---|
| 5,235,642 A | 8/1993 | Wobber et al. | |
| 5,761,329 A | 6/1998 | Chen et al. | |
| 6,463,474 B1* | 10/2002 | Fuh et al. | 709/225 |
| 6,671,812 B1 | 12/2003 | Balasubramaniam et al. | |
| 6,724,919 B1 | 4/2004 | Akiyama et al. | |
| 6,856,800 B1 | 2/2005 | Henry et al. | |
| 7,173,604 B2 | 2/2007 | Marvit et al. | |
| 7,206,022 B2 | 4/2007 | Miller et al. | |
| 7,222,361 B2 | 5/2007 | Kemper | |
| 7,231,068 B2 | 6/2007 | Tibor | |
| 7,231,657 B2 | 6/2007 | Honarvar et al. | |
| 7,243,245 B2 | 7/2007 | Pagan | |
| 7,322,040 B1 | 1/2008 | Olson et al. | |
| 7,363,494 B2 | 4/2008 | Brainard et al. | |
| 7,480,655 B2 | 1/2009 | Thomas et al. | |
| 7,802,278 B2 | 9/2010 | Kweon | |
| 7,861,081 B2* | 12/2010 | Yeap et al. | 713/167 |
| 7,882,386 B1* | 2/2011 | Potnis et al. | 714/2 |
| 7,970,724 B1 | 6/2011 | Hauser | |
| 8,001,383 B2* | 8/2011 | Hughes | 713/171 |
| 8,104,076 B1* | 1/2012 | Lam | G06F 21/6209 713/182 |
| 8,201,237 B1* | 6/2012 | Doane et al. | 726/15 |
| 8,244,211 B2 | 8/2012 | Clark | |
| 8,249,577 B2 | 8/2012 | Chmaytelli et al. | |
| 8,347,370 B2 | 1/2013 | Headley | |
| 8,370,640 B2 | 2/2013 | Adams et al. | |
| 8,386,773 B2 | 2/2013 | Sherkin et al. | |
| 8,689,294 B1* | 4/2014 | Thakur et al. | 726/4 |
| 8,776,190 B1* | 7/2014 | Cavage et al. | 726/5 |
| 8,819,182 B2* | 8/2014 | Howarter et al. | 709/219 |
| 2001/0047472 A1 | 11/2001 | Huntington et al. | |
| 2003/0084282 A1 | 5/2003 | Taruguchi | |
| 2004/0250135 A1 | 12/2004 | Haddad et al. | |
| 2005/0044044 A1 | 2/2005 | Burger et al. | |
| 2006/0015725 A1* | 1/2006 | Voice et al. | 713/168 |
| 2006/0018481 A1* | 1/2006 | Nagano et al. | 380/270 |
| 2006/0137016 A1 | 6/2006 | Margalit et al. | |
| 2006/0248083 A1 | 11/2006 | Sack et al. | |
| 2007/0192877 A1* | 8/2007 | Yoo et al. | 726/34 |
| 2007/0300292 A1* | 12/2007 | Scipioni et al. | 726/5 |
| 2008/0180212 A1* | 7/2008 | Aikawa et al. | 340/5.83 |
| 2009/0077644 A1 | 3/2009 | Hammell et al. | |
| 2009/0309698 A1 | 12/2009 | Headley et al. | |
| 2009/0320123 A1 | 12/2009 | Yu et al. | |
| 2010/0005529 A1* | 1/2010 | Hemade | 726/22 |
| 2010/0019026 A1* | 1/2010 | Hochfield et al. | 235/375 |
| 2010/0106977 A1* | 4/2010 | Persson | G06F 21/54 713/189 |
| 2010/0299721 A1* | 11/2010 | Awamoto | 726/3 |
| 2011/0078790 A1* | 3/2011 | Fazunenko et al. | 726/22 |
| 2011/0258682 A1* | 10/2011 | Yin | H04L 65/1093 726/3 |
| 2011/0314389 A1* | 12/2011 | Meredith | G06F 8/60 715/751 |
| 2012/0011575 A1 | 1/2012 | Cheswick et al. | |
| 2012/0019361 A1 | 1/2012 | Ben Ayed | |
| 2012/0047563 A1 | 2/2012 | Wheeler | |
| 2012/0054875 A1* | 3/2012 | Antill | 726/28 |
| 2012/0124662 A1 | 5/2012 | Baca et al. | |
| 2012/0171990 A1* | 7/2012 | Williams | H04W 4/24 455/406 |
| 2012/0182380 A1* | 7/2012 | Ohmae | G09B 7/00 348/14.03 |
| 2012/0266258 A1* | 10/2012 | Tuchman et al. | 726/28 |
| 2012/0317083 A1* | 12/2012 | Saxena et al. | 707/692 |
| 2013/0055346 A1* | 2/2013 | Singh | G06F 21/34 726/3 |
| 2013/0078952 A1* | 3/2013 | Yang | 455/411 |
| 2013/0144788 A1 | 6/2013 | Sherkin et al. | |
| 2013/0227677 A1* | 8/2013 | Pal et al. | 726/19 |
| 2014/0059675 A1* | 2/2014 | Batie, Jr. | G06F 21/32 726/19 |
| 2014/0187149 A1* | 7/2014 | Lortz et al. | 455/41.1 |
| 2014/0331292 A1* | 11/2014 | Krieger et al. | 726/5 |
| 2014/0372985 A1* | 12/2014 | Levin | G06F 11/3608 717/126 |
| 2014/0372986 A1* | 12/2014 | Levin | G06F 9/44589 717/126 |
| 2014/0379920 A1* | 12/2014 | Nathwani et al. | 709/226 |
| 2015/0034718 A1* | 2/2015 | Chesney et al. | 235/382.5 |

FOREIGN PATENT DOCUMENTS

| | | |
|---|---|---|
| WO | 2008094136 A1 | 8/2008 |
| WO | 20080144943 A1 | 12/2008 |
| WO | 2011157538 A1 | 12/2011 |

OTHER PUBLICATIONS

A. Bhargav-Spantzel et al., "Privacy Preserving Multi-Factor Authentication with Biometrics," 2nd ACM Workshop on Digital Identity Management (DIM), Nov. 2006, pp. 63-71.

\* cited by examiner

LOCAL AND REMOTE VERIFICATION

PRIORITY CLAIM

The present application claims the priority of U.S. Provisional Patent Application Ser. Nos. 61/726,778, 61/726,788 and 61/726,908, filed Nov. 15, 2012, which are incorporated by reference herein. The present application is also a continuation-in-part of U.S. patent application Ser. Nos. 14/025,333 and 14/025,377, filed Sep. 12, 2013, which are incorporated by reference herein. The present application is also related to commonly-assigned U.S. patent application Ser. Nos. 14/080,290 and 14/080,306, filed concurrently herewith and incorporated by reference herein.

FIELD

The field relates generally to user verification, and more particularly to techniques for verifying the identity of a user of an electronic device.

BACKGROUND

As technology grows and more information is stored electronically, it is necessary to protect private electronic information. A common means of protecting private electronic information is requiring a user's identity to be verified in order to access the electronic device on which the private electronic information is stored. Oftentimes only a single means of user authentication is required and the verification process is carried out remotely. One problem with remote verification is that it requires a network connection. If a network connection is not available, a user cannot be authenticated and is therefore unable to access private electronic information.

SUMMARY

Illustrative embodiments of the present invention provide improved techniques for verification of user identity both locally and remotely. Remote verification is attempted first, and in the event that a connection to a remote server cannot be established, local verification is attempted.

In one embodiment, a method comprises receiving a verification request in a verification agent running on a given device and determining whether the verification agent is able to invoke a verification platform application programming interface (API). The method also comprises, in the event that the verification agent is able to invoke the verification platform API, performing remote verification of the verification request via the verification platform. The method further comprises, in the event that the verification agent is unable to invoke the verification platform API, starting an internal timer and performing local verification of the verification request at the given device. The method further comprises granting the verification request responsive to one of a successful remote verification and a successful local verification within a given time period specified by the internal timer, otherwise denying the verification request.

In another embodiment, an apparatus comprises a processing device having a processor coupled to a memory. The processing device is configured to implement a verification agent configured to receive a verification request, to determine whether the verification agent is able to invoke a verification platform API, in the event that the verification agent is able to invoke the verification platform API to perform remote verification of the verification request via the verification platform, in the event that the verification agent is unable to invoke the verification platform API to start an internal timer and perform local verification of the verification request at the processing device, and to grant the verification request responsive to one of a successful remote verification and a successful local verification within a given time period specified by the internal timer, otherwise to deny the verification request.

In another embodiment, an apparatus comprises a verification platform. The verification platform comprises at least one processing device having a processor coupled to a memory and an API adapted for communication with a verification agent implemented on a given device. The verification platform is configured to perform remote verification with the verification agent responsive to the verification agent successfully invoking the API and to synchronize verification credentials with the verification agent for local verification on the given device in the event that the verification agent is unable to invoke the API. The verification credentials are used to determine whether to grant or deny a verification request generated at the given device.

All illustrations of the drawings are for the purpose of describing exemplary embodiments of the present invention and are not intended to limit the scope of the present invention in any way.

DETAILED DESCRIPTION

Illustrative embodiments of the present invention will be described herein with reference to exemplary systems and associated verification platforms, user devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which a single user device communicates with another processing device associated with a verification platform, systems in which at least two user devices each communicate with another processing device associated with a verification platform, and other types of systems.

As discussed above, embodiments overcome drawbacks associated with conventional techniques for verification of a user. In embodiments, remote verification is first attempted in order to provide user access to protected information. If a connection to a remote server cannot be established or the remote server cannot be found, local verification is attempted. Local verification must be performed within a predetermined period of time using locally stored verification data.

It will be assumed for description of the flowcharts of FIGS. 1 through 6 that the local and remote verification utilizes only a single user device, also referred to herein as a first device. The first device may be viewed as the primary device denoted in the exemplary system of FIG. 7. However, it will be apparent to those skilled in the art that the described arrangements can be adapted in a straightforward manner for use with primary and secondary user devices, or with three or more user devices.

A verification service for remote and local verification is implemented using a verification platform that illustratively includes a verification platform application programming interface (API) and a verification platform server. The verification platform API supports communication with a verification agent implemented on the user device. The verification application on the user device illustratively includes a login screen, an application selection screen, and a verification selection screen, but numerous alternative screen arrangements or other types of user interfaces can be used in other embodiments.

The embodiments of FIGS. 1 through 6 may be viewed as particular examples of arrangements in which a verification agent determines whether it is able to invoke the verification platform API and subsequently performs either remote or local verification of a verification request.

The verification request may be generated, for example, in conjunction with an attempted launch of a designated application on the user device, and user access to the designated application on the user device may be controlled responsive to the granting or denying of the verification request. The designated application on the user device is also referred to herein as a "secure application" or a "protected application" as its access from the user device is conditioned on satisfactory completion of rules-based multi-factor verification. A verification request may also be generated on occurrence of various other events and transactions. For example, a verification request may be generated when a user attempts to perform a particular action within a secure application rather than on attempted launch of the secure application. While verification requests are described below primarily in the context of a user attempt to launch a protected application, verification requests may be generated for numerous other events, transactions, etc.

The rules-based multi-factor verification is based on verification rules, which specify multiple distinct types of verification selected by the user and a sequence in which the selected types of verification are to be applied in processing the verification request for remote and local verification.

In the present embodiment, granting of the verification request requires that the user device be enrolled in the verification service supported by the verification platform. The user device must also have the verification application installed. Such enrollment may also be referred to herein as involving enrollment of a corresponding user in the verification service.

Figure 1:
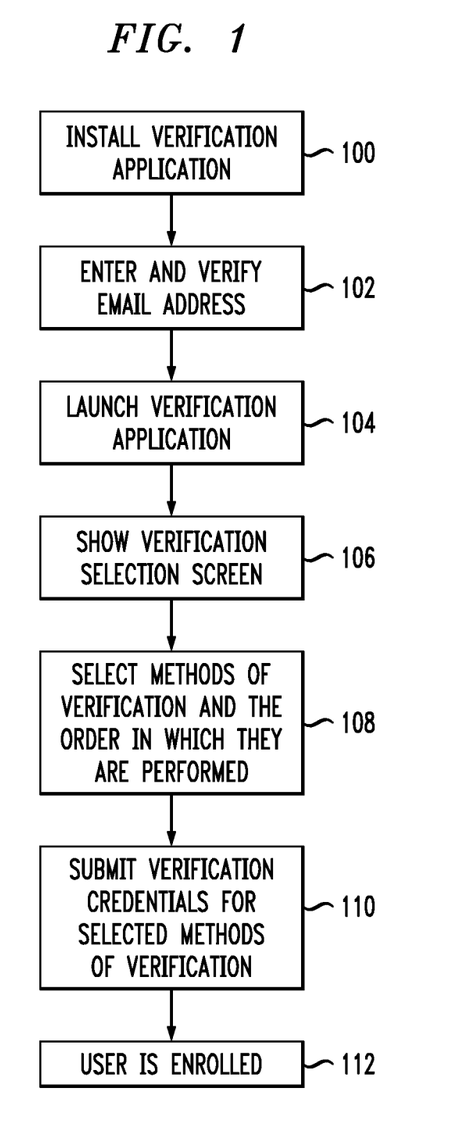
FIG. 1 is a flowchart illustrating a process for verification service registration and verification application installation.

An exemplary enrollment process for the user device is shown in FIG. 1. This process includes steps 100 through 112. In step 100, a user installs a verification application on the first device. After a user has installed the verification application, the user registers the first device. In step 102, the user enters and verifies an email address. Once the user has successfully submitted a valid email address and the email address has been verified, the user can utilize the verification application and verification service. More generally, a user may register with the verification service using a user identification. In some embodiments, the user identification may be the same as or different from the user's email address.

The verification application is launched in step 104. In step 106, a verification selection screen is shown. The verification selection screen prompts the user to select methods or modes of verification and the order in which they are performed.

It is possible for verification modes to be used in conjunction with one another or for a verification mode to act as a failsafe when another verification mode cannot be completed. For example, a user could choose to require both face and voice verification. In this case both modes of verification must be satisfied in order to gain access to the protected application. Alternatively, a user could require face or voice verification. In this case face verification would be attempted first and in the event that verification fails or cannot be performed, the device would attempt to authorize access using voice verification.

The number of verification modes, the sequence of verification modes used and the types of verification can be selected based on the desired level of protection. The methods used for verification include, by way of example, voice verification, face verification, live verification, location verification and motion verification. Various other modes of verification may be used in addition to or as an alternative to these modes of verification.

These verification methods are more generally referred to herein as distinct "types" of verification. By way of example, the user can select the types of verification he or she would like to use from a displayed list, and can also configure the particular manner in which the different types of verification are to be applied. The latter may involve the user specifying logic functions such as AND and OR between selected verification types that indicate the manner in which the selected verification types should be applied.

For example, a user could choose to require both face and voice verification to access to given secure application. In this case, the user selects the two verification types and specifies that they are to be applied in accordance with a logic AND function, such that both verification types must be satisfied in order to gain access to the secure application. Alternatively, the user could require face or voice verification. In this case, the user selects the two verification types and specifies that they are to be applied in accordance with a logic OR function, such that face verification would be attempted first and in the event that face verification fails, the device would attempt to authorize access using voice verification.

Such specifications are examples of what are more generally referred to herein as one or more "verification rules" established by a user. A given such verification rule or set of verification rules generally specifies multiple distinct types of verification selected by the user, and a sequence in which the selected verification types are to be applied in processing the verification request. Thus, the selection step 108 in the exemplary FIG. 1 process may be viewed as a user establishing one or more verification rules for rules-based multi-factor verification.

After selecting the methods of verification in step 108, verification credentials for the selected methods of verification are submitted in step 110. For example, voice verification requires a voice profile in order to subsequently verify the user's voice. Similarly, face verification or facial recognition requires one or more images of a user's face for verification credentials. Various other types of credentials may be required for other methods of verification. Once the verification credentials are submitted, the user is enrolled in step 112.

In some embodiments, alternative enrollment processes may be used. For example, the selection of particular verification types and sequence in which those types should be applied can be managed through a web-based administrative interface. Such management can be used to generate verification rules for a given user or for groups of multiple users and may further involve adding or removing users from particular groups or otherwise updating verification rules responsive to user input or designated policies. These and other provisioning functions may therefore be performed by a user or a system administrator.

Once a user has enrolled their electronic device and the desired modes of verification have been specified, the verification service may be utilized. The verification application is run in the background on the electronic device. The verification application implements a verification agent.

Figure 2:
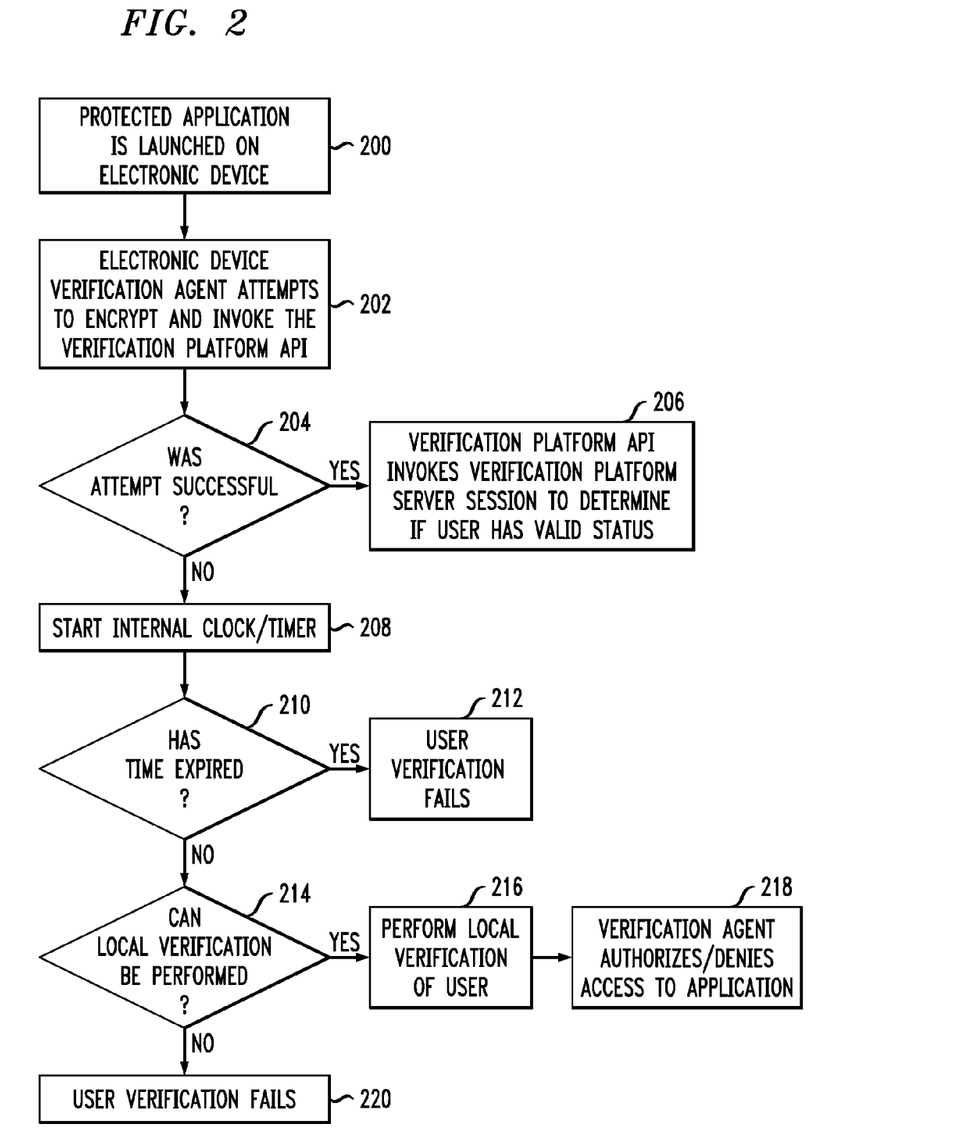
FIG. 2 is a flowchart illustrating a local verification process.

FIG. 2 shows a process for local verification of a user. In step 200, a protected application is launched on the device, and the verification agent intercepts the launch process. The verification agent then attempts to encrypt and invoke the verification platform API in step 202. Next, a determination is made as to whether the attempt to encrypt and invoke the verification platform API was successful in step 204. If the attempt was successful, the verification platform API invokes a verification platform server session to determine if the user has valid status in step 206. Step 206 initiates remote verification, which will be described in further detail with respect to FIG. 4.

If the attempt to encrypt and invoke the verification platform API is not successful, an internal clock or timer is started on the electronic device in step 208. The internal clock or timer is more generally referred to herein as a local timer. The local timer is activated by the verification agent and is set to expire after a predetermined period of time. The user must perform local verification within the predetermined time period in order to gain access to the protected application. In step 210, a determination is made as to whether the predetermined time period has expired. If the predetermined time period has expired, the user verification fails in step 212.

If the predetermined time period has not expired, the verification agent investigates the capabilities of the user's electronic device to determine if local verification can be performed in step 214. For example, if face verification is required and the user's electronic device does not have a camera, then face verification cannot be completed. Similarly, if voice verification is required and the user's electronic device does not have a microphone, voice verification cannot be performed. If location verification is required and the user's electronic device does not have global positioning system (GPS) sensors or other location determination sensors, location verification cannot be performed. If face verification or voice verification is required, however, then the user's electronic device need only have at least one of a camera and a microphone.

Figure 5:
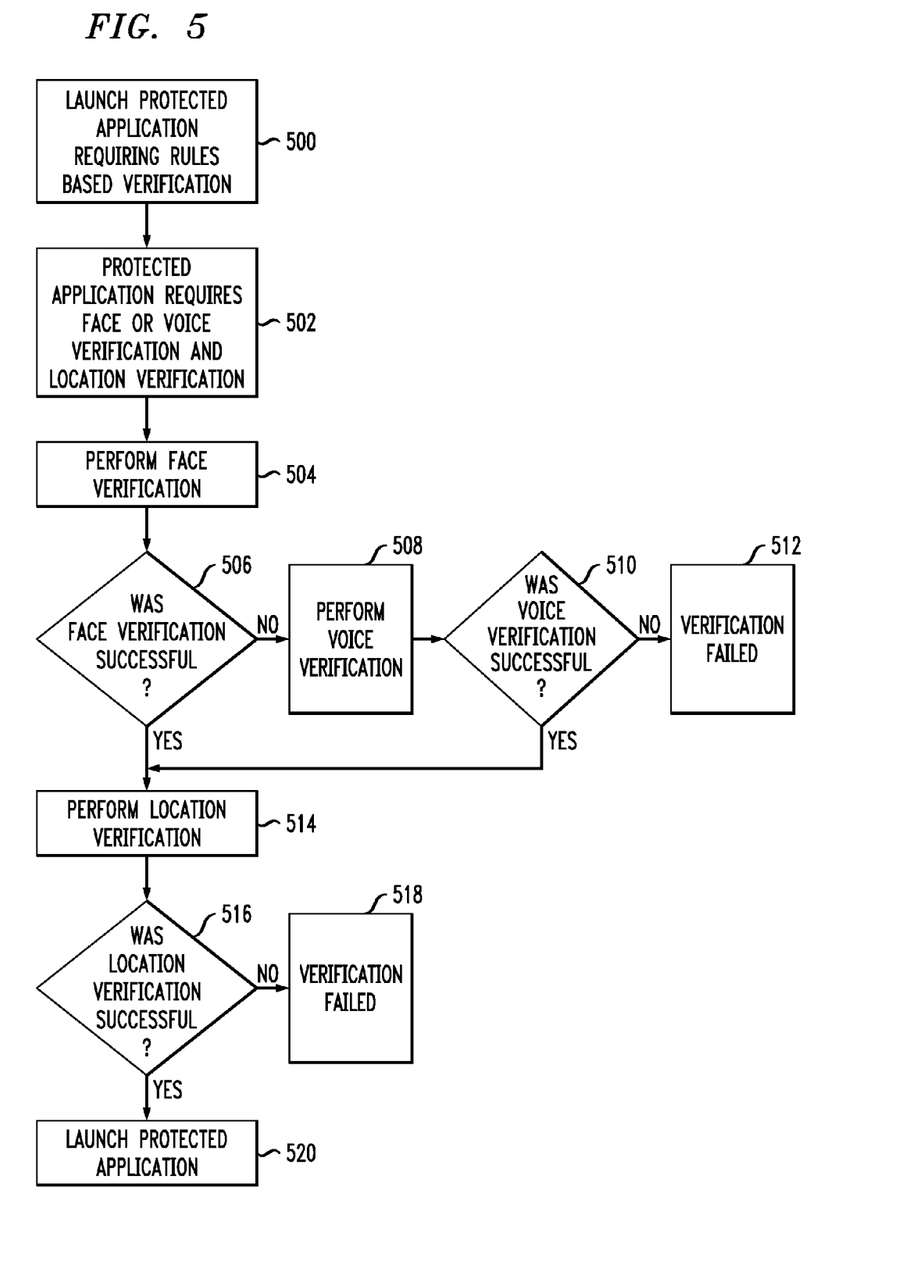
FIG. 5 is a flowchart illustrating a rules-based verification method.
Figure 6:
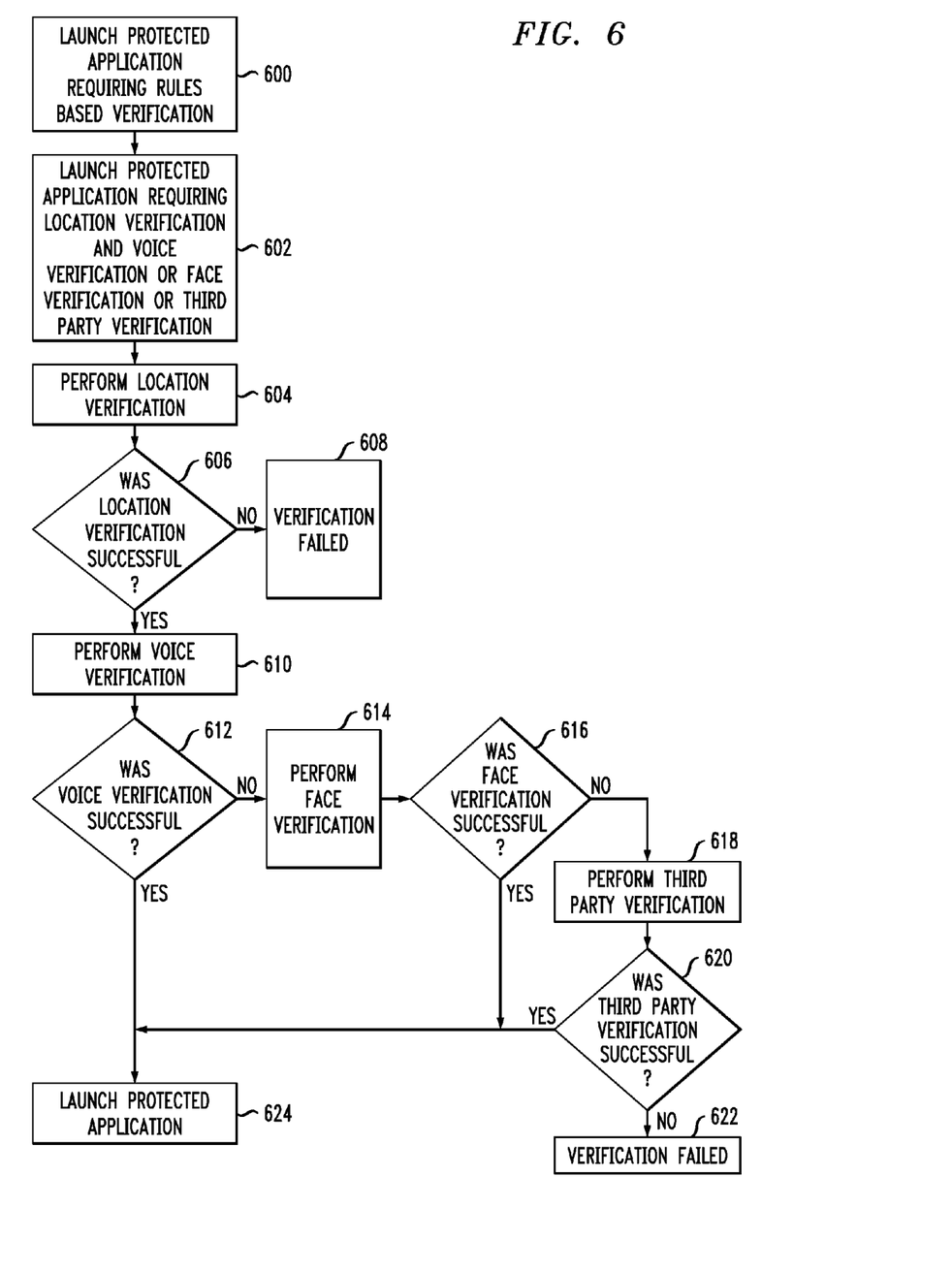
FIG. 6 is a flowchart illustrating another rules-based verification method.

When a user device is capable of collecting the required verification credentials, local verification can be performed in step 216. The local verification may be rules-based multi-factor authentication. FIGS. 5 and 6, which will be described in further detail below, detail two examples of rules-based verification which may be used for local and/or remote verification. The user submits the verification credentials required by the rules-based verification for accessing the protected application. The submitted verification credentials are then compared to locally stored verification data or credentials. If the submitted verification credentials are successfully matched to the locally stored verification data, the user is granted access to the protected application. Otherwise, the user is denied access to the protected application. The verification agent authorizes or denies access to the application in step 218. If the determination is made in step 214 that local verification cannot be performed, the user verification fails in step 220.

Figure 3:
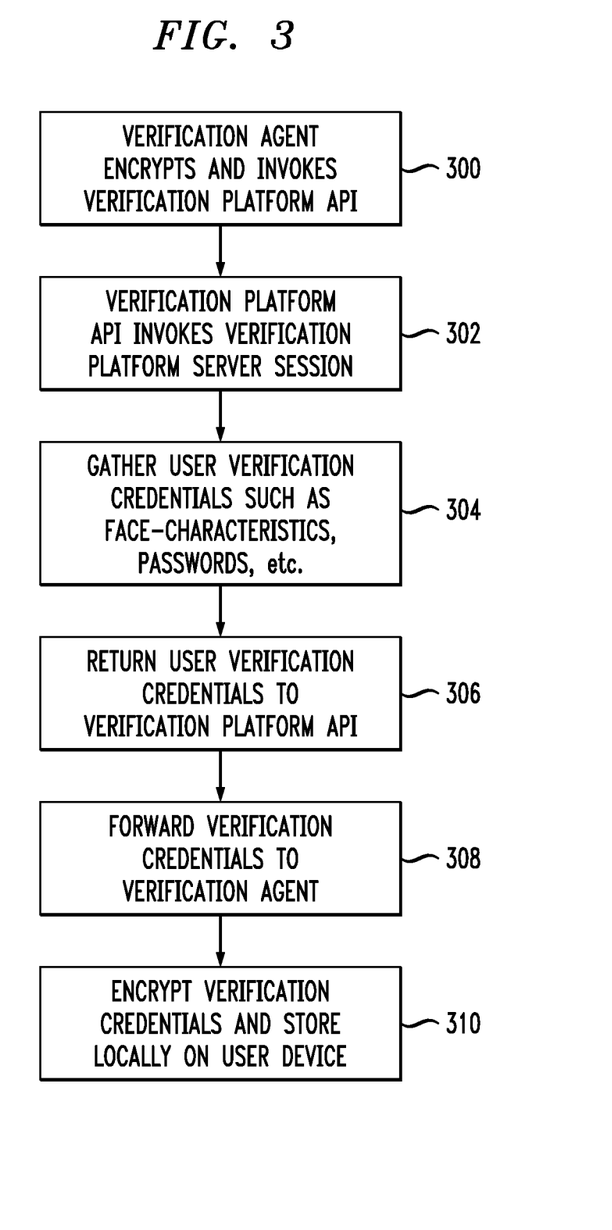
FIG. 3 is a flowchart illustrating synchronization of verification credentials.

Local verification requires that verification data or verification credentials are stored locally on the user's device. FIG. 3 illustrates a process for synchronizing verification credentials stored locally on the user's device with verification credentials stored remotely on the verification platform server in some embodiments of the invention. In other embodiments, local verification providers are not the same as remote verification providers. In such embodiments, synchronization need not be performed, as the verification credentials (e.g., biometric profiles such as voice and facial profiles) which are used for local verification may differ in format or specification from the verification credentials used for remote verification.

When a connection is available, the verification agent encrypts and invokes the verification platform API in step 300 to request copies of the remotely stored verification data. The verification agent can be programmed to attempt synchronization at predetermined intervals of time or whenever a connection to the verification platform API is available.

In step 302, the verification platform API invokes a verification platform server session. The verification platform server then gathers user verification credentials in step 304. The user verification credentials may include user facial images, user voice audio files, passwords, etc. Copies of the gathered verification credentials are then returned to the verification platform API in step 306. The verification credentials are then forwarded to the verification agent in step 308. In step 310, the verification credentials are encrypted and stored locally on the user's device. The locally stored verification data can then be accessed at a later time to perform local user verification. In some embodiments, different verification data or verification credentials can be synchronized and stored locally at different times according to the varying verification requirements for one or more protected applications.

Figure 4:
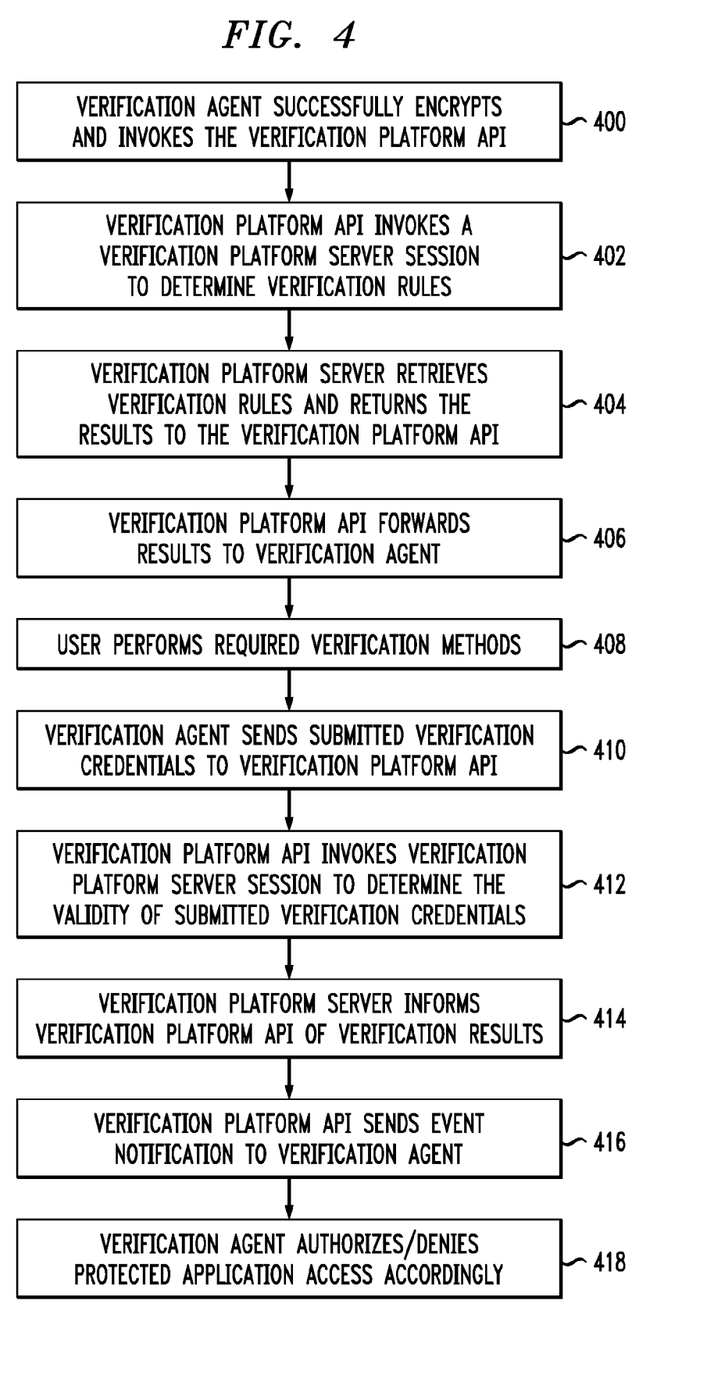
FIG. 4 is a flowchart illustrating a remote verification process.

FIG. 4 shows a remote verification process, which includes steps 400 through 418. If a connection between the verification agent and the verification platform API can be established, remote verification can be performed. In step 400, the verification agent successfully encrypts and invokes the verification platform API. The verification platform API then invokes a verification platform server session in step 402 to determine the verification rules for launching the protected application.

The verification platform server retrieves the verification rules and returns the results to the verification platform API in step 404. The verification platform server informs the verification platform API of any rules that must be met to launch the protected application. The verification platform API then forwards the results to the verification agent in step 406. Step 406 may comprise sending an event notification to the verification agent. The verification agent then sends a request for verification to the user through the verification application.

The user performs the required modes of verification on the electronic device in step 408. The verification agent sends submitted verification credentials to the verification platform API in step 410. The verification agent may encrypt and invoke the verification platform API after completion of each verification mode. The verification platform API invokes a verification platform server session in step 412 to determine the validity of the submitted verification credentials for each mode of verification. In step 414, the verification platform server informs the verification platform API of the verification results. The verification platform API then sends an event notification to the verification agent in step 416. The event notification comprises the verification results. The verification agent then authorizes or denies access to launch the protected application based on the verification results in step 418.

FIGS. 5 and 6 show two examples of rules-based verification methods. It is to be appreciated, however, that various other examples of rules-based verification are possible using different combinations of verification rules, modes, etc. Using logical AND/OR syntax, any combination of verification modes can be used depending on the level of security desired. Using the logical AND, a user can determine the number of levels of security required to be passed in order for verification to be successful. Using the logical OR, a user can determine the number of fallback verification methods used for each level of verification. Rules-based verification syntax is read from left to right and can incorporate parenthesis to group verification modes together.

FIG. 5 shows a rules-based verification process in which face or voice verification is required in addition to location verification. The process begins with step 500, where the user attempts to launch a protected application requiring rules-based verification. In step 502, it is determined that the protected application requires face OR voice verification AND location verification. Thus, the process has two levels of security. The first level is face or voice verification, and the second level is location verification. Face verification is performed in step 504. In step 506, a determination is made as to whether the face verification was successful. If the face verification was not successful, the process proceeds to step 508 where voice verification is performed. In step 510 a determination is made as to whether the voice verification was successful. If the voice verification was not successful, then verification fails in step 512.

If the face verification is determined to be successful in step 506 or if the voice verification is determined to be successful in step 510, location verification is performed in step 514. Next, a determination is made as to whether the location verification was successful in step 516. If the location verification is not successful, then verification fails in step 518. If the location verification is successful, then the verification succeeds and the protected application is launched in step 520.

FIG. 6 shows another example of a rules-based verification process. In step 600, a user launches an application that requires rules-based verification. In step 602, the protected application is determined to require location verification AND voice verification OR face verification OR third party verification. Thus, the process has two levels of security. The first level of security is location verification while the second level of security is voice or face or third party verification. The second level of security has two fallback verification methods, namely, face verification and third party verification.

Location verification is performed in step 604. In step 606, a determination is made as to whether the location verification was successful. If the location verification is not successful, then verification fails in step 608. If the location verification is successful, voice verification is performed in step 610. Next, a determination is made in step 612 as to whether the voice verification was successful. If the voice verification fails, then face verification is performed in step 614.

In step 616, a determination is made as to whether the face verification was successful. If the face verification is not successful, then third party verification is performed in step 618. A determination is then made in step 610 as to whether the third party verification was successful. If the third party verification is not successful, then verification fails in step 622. If voice verification, face verification or third party verification is successful, then the protected application is launched in step 624.

Communications between the verification agent and the verification platform API may utilize one or more of JavaScript Object Notation syntax, REpresentational State Transfer (REST) based client-server architecture and mutual client-server certificate-based encryption and authentication.

As a more particular example of communications of the latter type, a verification application acting as a client provides a certificate to the verification platform server and the server provides its certificate to the client. Both certificates are verified using a certificate authority, which has signed both the client and server certificates. The information is transmitted between the client and server over a Secure Socket Layer (SSL), using 128 bit or 256 bit Advanced Encryption Standard (AES) cipher encryption. The cipher encryption strength may be selected at least in part as a function of parameters such as device operating system type and transport capabilities, as well as other factors influencing the ability of a given device to support the desired encryption level.

It should be understood that the above-noted communication types are only examples, and numerous other communications may be used in other embodiments. Additional details regarding the above-noted AES techniques as well as examples of other cryptographic techniques suitable for use in providing secure communications in embodiments of the invention can be found in A. J. Menezes et al., Handbook of Applied Cryptography, CRC Press, 1997, which is incorporated by reference herein.

As indicated above, a wide variety of different verification types may be made available for user selection as part of one or more verification rules in a given embodiment of the invention.

It is to be appreciated that processing operations and other system functionality such as that described in conjunction with FIGS. 1 through 6 can be implemented at least in part in the form of one or more software programs stored in memory and executed by a processor of a processing device such as a computer or server. As will be described below, a memory or other storage device having such program code embodied therein is an example of what is more generally referred to herein as a "processor-readable storage medium."

Also, the particular processing operations and other system functionality described in conjunction with the flowcharts of FIGS. 1 through 6 are presented by way of illustrative example only, and should not be construed as limiting the scope of the invention in any way. Alternative embodiments can use other types of processing operations for rules-based multi-factor verification or other types of verification of user identity implemented using one or more user devices and a verification platform. For example, the ordering of the process steps may be varied in other embodiments, or certain steps may be performed concurrently with one another rather than serially.

It was noted above that in some embodiments, two or more user devices are utilized. For example, in the remote verification process of FIG. 4, a different device may be used for performing required modes of verification and submitting verification credentials. If two devices are used for verification then the two devices need not communicate with one another directly but instead can communicate through a verification platform.

Figure 7:
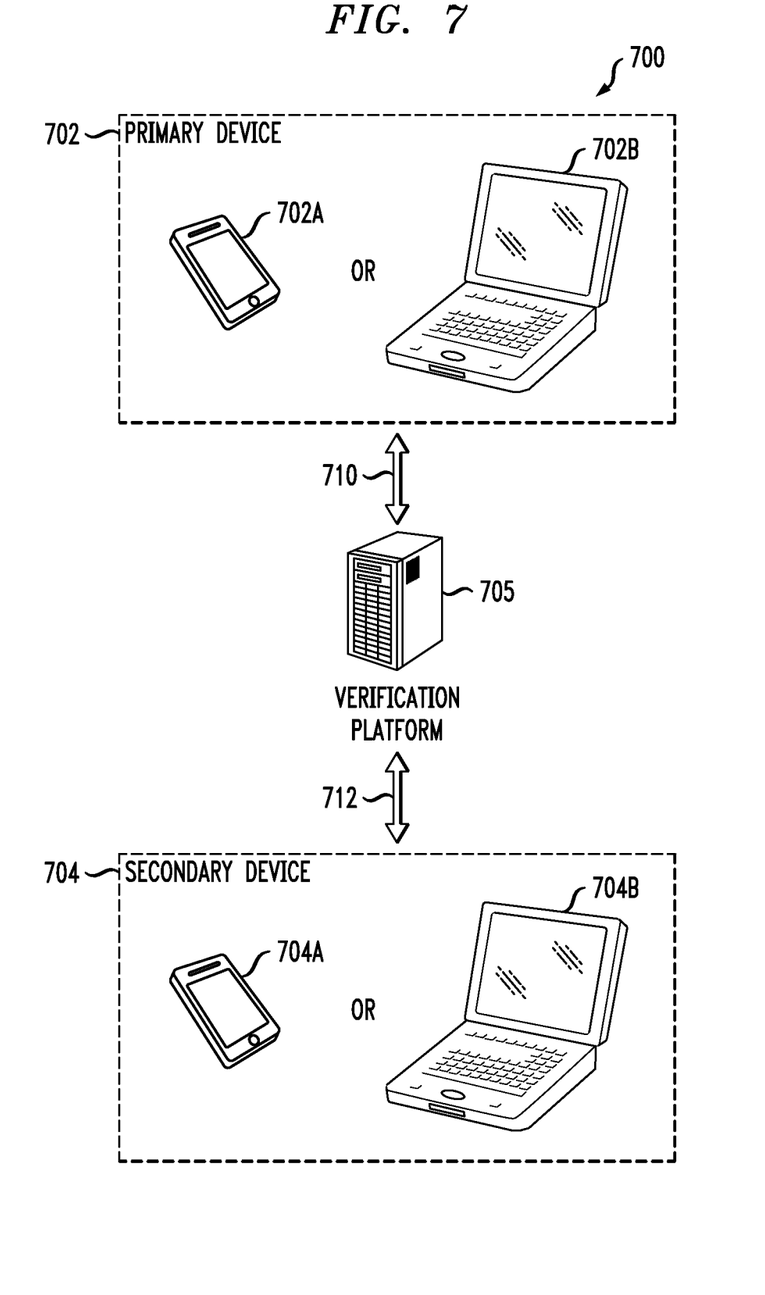
FIG. 7 shows an exemplary communication system comprising primary and secondary devices that communicate with a verification platform supporting the verification service.

An exemplary communication system in an embodiment of this type is shown in FIG. 7. In this embodiment, a communication system 700 comprises a primary device 702, a secondary device 704 and a verification platform 705 arranged between the primary and secondary devices. The verification platform 705 communicates with the primary and secondary devices 702 and 704 via respective communication channels 710 and 712. In the present embodiment, there is no pairing or other direct communication required between the primary and secondary devices. The primary device 702 is illustratively shown as comprising one of a mobile telephone 702A or a laptop computer 702B. Similarly, the secondary device 704 is illustratively shown as comprising one of a mobile telephone 704A or a laptop computer 704B. A wide variety of other types of electronic devices may be used in other embodiments, including by way of example tablets, smart watches, desktops, and various other processing and computing devices.

The primary device 702 and the secondary device 704 are both configured to run the rules-based multi-factor verification application.

The verification platform 705 is configured to include a verification platform API and a verification platform server as noted above, but may comprise additional or alternative components in other embodiments.

In the FIG. 7 embodiment, a verification request is sent from the primary device 702 and processed by the verification platform 705 to determine an appropriate notification to send to the secondary device 704 for remote verification. The secondary device is used to provide verification input to the verification platform responsive to the notification and in accordance with the selected verification types so as to thereby control access to an application on the primary device. It is assumed that verification agents of the type previously described run on both the primary and secondary devices, and information is sent from a given such verification agent to the verification platform API in encrypted form. The verification platform API communicates with the verification platform server to determine one or more verification rules and to process verification input in the manner previously described.

The use of the verification platform as an intermediary between the primary and secondary devices allows for enhanced communication security, thereby reducing vulnerability to hacking.

In other embodiments, the primary and secondary devices pair with one another locally rather than through the verification platform. In such embodiments, the primary and secondary devices connect to one another using Bluetooth or a Near Field Communication (NFC) interface. For example, a user may have a smartphone which connects to a wearable verification device. The wearable verification device includes firmware and provides key management and cryptography, making the wearable verification device suitable for use as a secure element for user verification. The wearable verification device may take a number of physical form factors, such as an adhesive label, a credit card or smartcard, key fob, tag, smartwatch or other wearable device with an embedded processing device.

The primary device 702 in the FIG. 7 embodiment may be viewed as the first user device in other embodiments described herein.

In some embodiments, other types of verification in addition to or in place of the above-described voice, face, location, motion and third party verification can be used. For example, numeric token verification or approve/decline verification may be used. Numeric token verification can be implemented by sending digits to the secondary device. The digits must then be entered into the primary device within a predetermined length of time to determine verification. Approve/decline verification can be implemented by sending a message with the option to either approve or decline to the secondary device. From the secondary device, a user can allow verification by selecting approve or can deny verification by selecting decline. Other types of verification based on behavioral knowledge, gestures, colors or other types of information may be used, in any combination.

The communication system 700 or portions thereof may be implemented using one or more processing platforms. For example, verification platform 705 may be implemented on a processing platform comprising a plurality of networked processing devices. An example of such a processing platform is processing platform 800 shown in FIG. 8.

Figure 8:
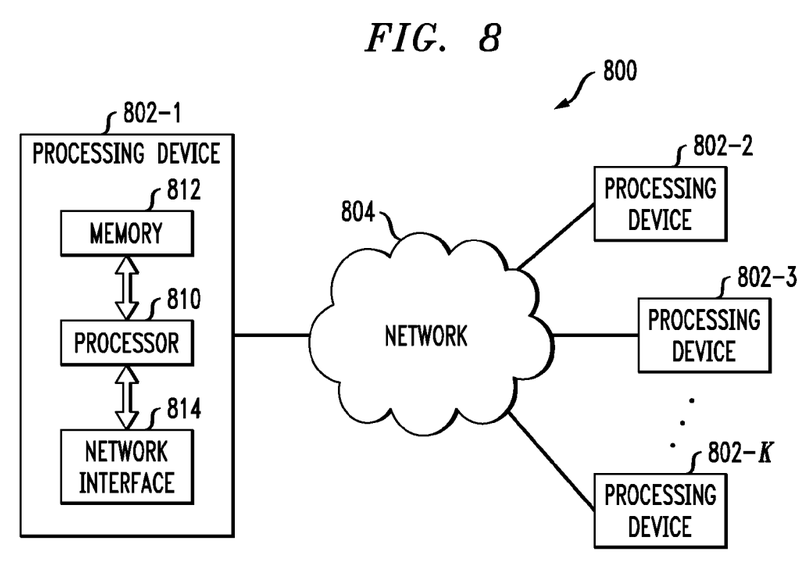
FIG. 8 shows an example of a processing platform comprising a set of networked processing devices that may be utilized to implement at least a portion of the communication system of FIG. 7.

The processing platform 800 in this embodiment comprises a portion of system 700 and includes a plurality of processing devices, denoted 802-1, 802-2, 802-3, . . . 802-K, which communicate with one another over a network 804.

The network 804 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA) or other type of processing circuitry, as well as portions or combinations of such circuitry elements, and the memory 812, which may be viewed as an example of a processor-readable storage medium having executable computer program code embodied therein, may comprise random access memory (RAM), read-only memory (ROM) or other types of memory, in any combination.

Also included in the processing device 802-1 is network interface circuitry 814, which is used to interface the processing device with the network 804 and other system components, and may comprise one or more conventional transceivers.

The other processing devices 802 of the processing platform 800 are assumed to be configured in a manner similar to that shown for processing device 802-1 in the figure.

Again, the particular processing platform 800 shown in the figure is presented by way of example only, and communication system 700 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the communication system 700. Such components can communicate with other elements of the communication system 700 over any type of network or other communication media.

As indicated previously, components of a communication system as disclosed herein can be implemented at least in part in the form of one or more software programs stored in memory and executed by a processor of a processing device such as one of the processing devices 802. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It should again be emphasized that the above-described embodiments of the invention are presented for purposes of illustration only. Many variations and other alternative embodiments may be used. For example, the particular types and arrangements of user devices, verification platforms and applications used in a given embodiment can be varied, as can the particular types of messaging or other communications exchanged between system components. Also, a wide variety of different types of verification rules, verification types, sequences and security levels may be used other than those explicitly described herein. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   registering a given user with a verification platform, the verification platform comprising at least one verification platform server and a verification platform application programming interface (API) adapted for communication with a verification agent implemented on a given processing device of the given user;
   sending, from the verification agent to the verification platform via the verification platform API, a specification of verification rules to be used by the verification platform in authenticating a verification request from the given user, the verification rules specifying two or more different types of verification, a verification mode for each of the two or more different types of verification and a sequence for performing the two or more different types of verification;
   synchronizing, with the verification platform server, verification credentials associated with the given user for each of the two or more different types of verification;
   receiving a verification request in the verification agent running on the given processing device; and
   authenticating the verification request utilizing the specified verification rules and the synchronized verification credentials;
   wherein authenticating the verification request comprises:
   determining whether the verification agent is able to invoke the verification platform API;
   in the event that the verification agent is able to invoke the verification platform API, performing remote verification of the verification request via the verification platform; and
   in the event that the verification agent is unable to invoke the verification platform API:
   starting an internal timer;
   performing local verification of the verification request at the given processing device; and
   granting the verification request responsive to a successful local verification within a given time period specified by the internal timer.

2. The method of claim 1 further comprising determining whether the verification agent is able to invoke the verification platform API after expiration of the given time period specified by the internal timer in the event that local verification within the given time period is unsuccessful.

3. The method of claim 1 wherein performing local verification of the verification request comprises determining whether the given processing device is capable of performing local verification.

4. The method of claim 3 wherein determining whether the given processing device is capable of performing local verification comprises
   determining whether the given device comprises hardware capable of performing the two or more different types of verification in the specified verification rules.

5. The method of claim 1 wherein the verification request is generated in conjunction with an attempted launch of a designated application on the given processing device and wherein user access to the designated application on the given processing device is controlled responsive to the granting or denying of the verification request.

6. The method of claim 1 wherein the two or more different types of verification comprise two or more of voice verification, face verification, location verification, motion verification and third party verification.

7. The method of claim 1 wherein the sequence for performing the two or more different types of verification comprises two or more security levels in which each security level requires satisfaction of at least one of the two or more different types of verification.

8. The method of claim 7 wherein a given one of the security levels is configured so as to require satisfaction of only one of at least two different types of verification associated with the given security level.

9. A non-transitory processor-readable storage medium having embodied therein one or more software programs, wherein the one or more software programs when executed by at least one processing device cause the at least one processing device to implement a verification agent configured:
   to register a given user with a verification platform, the verification platform comprising at least one verification platform server and a verification platform application programming interface (API) adapted for communication with the verification agent;
   to send, to the verification platform via the verification platform API, a specification of verification rules to be used by the verification platform in authenticating a verification request from the given user, the verification rules specifying two or more different types of verification, a verification mode for each of the two or more different types of verification and a sequence for performing the two or more different types of verification;
   to synchronize verification credentials associated with the given user for each of the two or more different types of verification with the verification platform server;
   to receive a verification request; and
   to authenticate the verification request utilizing the specified verification rules and the synchronized verification credentials;
   wherein the verification agent is configured to authenticate the verification request by:

determining whether the verification agent is able to invoke the verification platform API;
in the event that the verification agent is able to invoke the verification platform API, performing remote verification of the verification request via the verification platform; and
in the event that the verification agent is unable to invoke the verification platform API:
starting an internal timer;
performing local verification of the verification request at the processing device; and
granting the verification request responsive to a successful local verification within a given time period specified by the internal timer.

10. An apparatus comprising:
a processing device having a processor coupled to a memory;
the processing device being configured to implement a verification agent configured:
to register a given user with a verification platform, the verification platform comprising at least one verification platform server and a verification platform application programming interface (API) adapted for communication with the verification agent;
to send, to the verification platform via the verification platform API, a specification of verification rules to be used by the verification platform in authenticating a verification request from the given user, the verification rules specifying two or more different types of verification, a verification mode for each of the two or more different types of verification and a sequence for performing the two or more different types of verification;
to synchronize verification credentials associated with the given user for each of the two or more different types of verification with the verification platform server;
to receive a verification request; and
to authenticate the verification request utilizing the specified verification rules and the synchronized verification credentials;
wherein the verification agent is configured to authenticate the verification request by:
determining whether the verification agent is able to invoke the verification platform API;
in the event that the verification agent is able to invoke the verification platform API, performing remote verification of the verification request via the verification platform; and
in the event that the verification agent is unable to invoke the verification platform API:
starting an internal timer;
performing local verification of the verification request at the processing device; and
granting the verification request responsive to a successful local verification within a given time period specified by the internal timer.

11. The apparatus of claim 10 wherein the verification agent is further configured to determine whether the verification agent is able to invoke the verification platform API after expiration of the given time period specified by the internal timer in the event that local verification within the given time period is unsuccessful.

12. An apparatus comprising:
a verification platform comprising:
at least one processing device having a processor coupled to a memory; and
a verification platform application programming interface (API) adapted for communication with a verification agent implemented on a given processing device associated with a given user;
wherein the verification platform is configured:
to register the given user with the verification platform;
to receive, via the verification platform API, a specification of verification rules to be used by the verification platform in authenticating a verification request from the given user, the verification rules specifying two or more different types of verification, a verification mode for each of the two or more different types of verification and a sequence for performing the two or more different types of verification;
to synchronize verification credentials associated with the given user for each of the two or more different types of verification at the verification platform server;
to receive, via the verification platform API, a verification request from the given user; and
to authenticate the verification request utilizing the specified verification rules and the synchronized verification credentials;
wherein authenticating the verification request comprises:
performing remote verification with the verification agent responsive to the verification agent successfully invoking the verification platform API; and
synchronizing the verification credentials with the verification agent for local verification on the given processing device in the event that the verification agent is unable to invoke the verification platform API; and
wherein the verification request is granted at the given processing device responsive to a successful local verification within a given time period specified by an internal timer of the given processing device.

13. The method of claim 1 wherein the verification mode for each of the two or more different types of verification comprises one of local verification of submitted verification credentials at the verification agent and remote verification of submitted verification credentials at the verification platform.

14. The method of claim 1 wherein synchronizing the verification credentials comprises:
sending a request to invoke a verification platform server session from the verification agent via the verification platform API;
receiving, at the verification agent, verification credentials associated with the given user for each of the two or more different verification methods; and
encrypting and storing the verification credentials on the given processing device.

15. The method of claim 14 wherein sending the request to invoke the verification platform server session comprises sending requests for distinct first and second verification platform server sessions for synchronizing verification credentials associated with first and second different ones of the two or more different types of verification.

16. The method of claim 1 wherein receiving the verification request from the given user comprises:
receiving a request to invoke a verification platform sever session via the verification platform API from the verification agent; and
utilizing the verification platform server session to determine the verification rules for authenticating the verification request from the given user.

17. The apparatus of claim 12 wherein the verification platform is configured to synchronize the verification credentials by:

receiving a request to invoke a verification platform server session from the verification agent via the verification platform API;

gathering verification credentials associated with the given user for each of the two or more different verification methods; and forwarding the verification credentials to the verification agent for encryption and storage on the given processing device.

18. The apparatus of claim 12 wherein the verification platform is configured to receive the verification request from the given user by:

receiving a request to invoke a verification platform sever session from the verification agent via the verification platform API; and utilizing the verification platform server session to determine the verification rules for authenticating the verification request from the given user.

19. The apparatus of claim 12 wherein the verification platform is configured to perform remote verification with the verification agent by:

retrieving the verification rules for the given user;

returning the verification rules to the verification agent via the verification platform API;

receiving submitted verification credentials from the given processing device via the verification platform API;

utilizing the verification platform server session to determine validity of the submitted verification credentials; and sending verification results from the verification platform server to the verification agent via an event notification generated by the verification platform API.

20. The apparatus of claim 12 wherein the specification of verification rules comprises at least one of:

adding or removing the given user from one or more groups of users, each group of users having a set of verification rules associated therewith; and modifying the verification rules associated with at least one of the groups of users to which the given user belongs.

\* \* \* \* \*